July 6, 1965  R. L. BERNHARD  3,192,735
COOLING COIL FOR HERMETIC MOTOR USING SYSTEM REFRIGERANT
Filed Sept. 12, 1961

INVENTOR.
RICHARD L. BERNHARD
BY
SMITH, WILSON, LEWIS & McRAE

United States Patent Office 3,192,735
Patented July 6, 1965

3,192,735
COOLING COIL FOR HERMETIC MOTOR USING SYSTEM REFRIGERANT
Richard L. Bernhard, Birmingham, Mich., assignor to American Radiator & Standard Sanitary Corporation, New York, N.Y., a corporation of Delaware
Filed Sept. 12, 1961, Ser. No. 139,330
8 Claims. (Cl. 62—222)

This application is a continuation-in-part of copending application Serial No. 755,539, filed August 18, 1958, now abandoned.

This invention relates to the cooling of electric motors, and more particularly to the use of a system embodying a refrigeration cycle for cooling electric motors.

According to the prior art, heavy duty electric motors such as those utilized for driving heavy duty compressors of industrial air conditioning installations have been either air or water cooled. Of necessity, when air-cooled, such motors have been built to extremely large dimensions to provide adequate radiation surfaces to permit the large quantities of heat generated thereby to be dissipated. The prior art air-cooled constructions have often resulted in electric motors that are of actually larger physical size than the efficient, rotary centrifugal compressors which they drive. Accordingly, such large driving motors and the attendant component structures of the refrigeration system have taken substantial amounts of valuable room from within the building structures with which they are associated. Further, the weight of these large motor units has often required supplemental bracings or building supports for installation.

The prior art water-cooled units have required substantial amounts of auxiliary equipment in the form of pumps, cooling towers and the like, as well as extensive plumbing with flow control valves, etc. Also, problems of water-treating scale and algae formation, freezing and malfunctions involving dangerous, high-pressure steam formation have been involved, requiring frequent cleaning and maintenance.

Thus, the prior art structures have presented a number of disadvantages and problems, which if solved in a manner to provide more compact electric drive motors for heavy duty, industrial refrigeration systems and the like would provide a substantial advance in the art.

Accordingly, an apparatus has now been developed for cooling electric motors such as those used in driving heavy duty refrigeration systems whereby the motors can be substantially reduced in size to render them extremely compact as related to their horsepower output. Thus, in accordance with the present invention, reductions in size of 50% or more of motors of the 200–400 horsepower capacity range are not uncommon.

It will be obvious that when motors of this horsepower are so reduced in size, extremely large quantities of intense heat will be generated within the motors as they are run under heavy load conditions. In accordance with the present invention these tremendous quantities of heat are rapidly and efficiently dissipated; thus, the present invention permits continuous operation of such compact motors, and prevents burn-outs that would otherwise occur.

It is therefore an important object of the present invention to provide apparatus for cooling an electric motor to safe operating temperatures while substantially reducing the size of the motor without sacrifice in horsepower output.

Another important object is to provide an appaartus for cooling an electric motor utilizing a liquefied refrigerant wherein the refrigerant is vaporized in intimate but isolated heat-exchange relationship to the heat-producing parts of the motor.

A further object of the invention is to provide a motor cooling system wherein an electric motor used to drive a compressor is cooled by the refrigerant, thereby eliminating the danger of overheating which can occur with conventional water cooling systems.

Another object of the invention is to provide a compressor motor cooling system which requires no cooling fluid other than the refrigerant operated on by the compressor.

Another object of the invention is to provide a compressor motor cooling system having a minimum number of fluid lines, control valves and other control devices so as to enable construction and installation of the system as a relatively low cost mechanism.

Another object of the invention is to provide a compressor motor cooling system wherein the cooling fluid is maintained out of direct contact with the operating parts of the motor so as to prevent entrainment of motor lubricating oil in the refrigerant stream, it being appreciated that the entrainment of such oil would have a deleterious effect on the heat transfer operations in the refrigerant evaporator and refrigerant condenser.

Another object of the invention is to provide a compressor motor cooling system which can be used with conventional compressor motors without alteration or redesign of the motor parts.

Another object of the invention is to provide a compressor motor cooling system which can easily be constructed as a simplified, leak-free mechanism so as to promote trouble-free operation and reduce maintenance costs to a minimum.

Another object of the invention is to provide a compressor motor cooling system which can incorporate either manual cooling rate controls or automatic cooling rate controls with minimum alteration of the system, thereby enabling manufacture of the two types of systems by a single manufacturer with relatively low total manufacturing costs.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology emplyed herein is for the purpose of description and not of limitation.

*Brief perspective*

Briefly the present invention provides a method and apparatus for cooling heavy duty electric motors as typified by those utilized to drive industrial refrigeration compressors, wherein liquid refrigerant from the high side of a refrigeration system is led into an evaporator positioned within the motor casing in intimate, heat-exchange relationship to the rotor and stator thereof. The outlet from the motor evaporator is discharged to the low pressure side of the refrigeration system, upstream of the compressor. By so operating, liquid refrigerant introduced into the evaporator within the motor casing is quickly evaporated, thereby extracting tremendous quantities of heat from the motor and being flashed to the vapor state by discharge into the low pressure side of the refrigeration system.

It is within the scope of this invention to draw refrigerant from a system which the motor drives; and also to provide a refrigeration system for heavy duty motors of other application.

The environment

Figure 1:
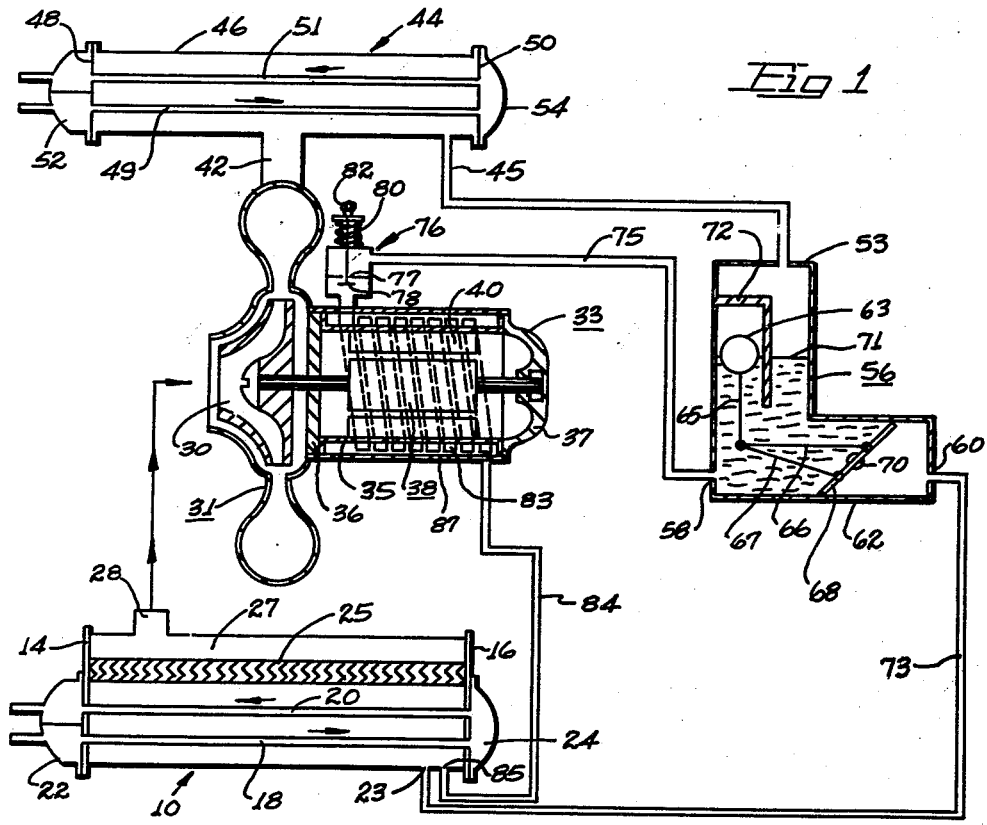
FIGURE 1 is a schematic view showing a refrigerating system having one embodiment of the invention incorporated therein.

In FIGURE 1 of the drawings there is shown a refrigerant system including an evaporator 10 formed by a cylindrical tank having tube sheets 14 and 16, between which extend a plurality of water tubes 18 and 20. Water boxes 22 and 24 are secured to the tube sheets 14 and 16 to provide a closed circuit for the passage of heat transfer fluid through the tubes 18 and 20 in the directions indicated by the arrows. The water or other heat transfer fluid within the tubes 18 and 20 is cooled by the boiling action of the liquid refrigerant supplied to the evaporator inlet 23, the gases generated by the boiling action passing through baffle structure 25. The baffle structure 25 functions to prevent entrainment of liquid refrigerant in the evaporated refrigerant within the upper portion 27 of the evaporator.

Gaseous refrigerant from outlet 28 of the evaporator is fed into a conventional impeller 30 of a centrifugal compressor 31. Impeller 30 is preferably driven by a hermetic type electric motor 33 which, as shown in the drawings, comprises a generally cylindrical inner casing 35, having end plates 36 and 37, rotor 38 and a stator structure 40.

The compressed refrigerant from the compressor 31 is fed through a line 42 to a condenser 44 which comprises a cylindrical tank structure 46 having tube sheets 48 and 50 closed by water boxes 52 and 54. A series of water tubes 49 and 51 extend between the tube sheets 48 and 50 to circulate water through the condenser in the directions indicated by the arrows. It will be understood that heated gaseous refrigerant flowing from the inlet line 42 into the condenser is condensed as it passes over the water tubes 49 and 51 and the condensed refrigerant drains into the condenser outlet line 45.

Line 45 connects with the top wall 53 of a float chamber casing 56. The casing 56 is provided with spaced outlets 58 and 60 adjacent its bottom wall 62. Within the casing 56 is provided a float in the form of a ball 63. Ball 63 is connected with a rod 65 which extends downwardly to a pivotal connection with levers 66 and 67. The right end of levers 66 and 67 connects with a butterfly valve 68 fulcrumed at 70 in the casing 56.

In the operation of the float chamber device, condensed refrigerant from line 45 flows downwardly over baffle 72 so as to maintain a liquid level 71 in the float chamber. Any tendency of the liquid level 71 to fall below the substantially predetermined position shown in the drawings is effective to lower the position of the float 63 with a consequent counterclockwise motion of levers 66 and 67 resulting in a movement of the valve 68 in the closing direction. Closing of valve 68 causes the condensed refrigerant from line 45 to collect in the float casing and thereby restore the surface level 71 to its illustrated position. Any tendency of the condensed refrigerant to build up to a level higher than that illustrated in the drawing is effective to raise float 63 and thereby open valve 68. Baffle structure 72 prevents refrigerant from the line 45 from directly striking the float 63 in such a manner as to upset the desired balance. Outlet 60 from the casing 56 is connected with a refrigerant line 73 which leads to an evaporator inlet 23.

The invention

Outlet 58 from the casing 56 is connected with a refrigerant line 75 which leads to a variable orifice restrictor device constructed as an automatic expansion valve 76. Expansion valve 76 is schematically illustrated to include an orifice 77 adapted to be opened and closed by a valve element 78 which is biased to the closed position by means of a compression spring 80. A manually adjustable nut 82 is provided to vary the force exerted by the spring 80 so as to control refrigerant pressure in accordance with desired operating conditions.

Expansion valve 76 is connected with a motor-cooling jacket structure which, in the illustrated embodiment, takes the form of a coiled tube or passages 83. Tube 83 connects with a line 84 which leads to a low pressure area, as for example an inlet 85 to the evaporator 10. It will be understood that during the passage of refrigerant through the tubes or passages 83, heat is extracted from the motor so as to wholly or partially vaporize the refrigerant. In this manner the motor is caused at all times to operate within a safe motor operating temperature, as for example a temperature below 240° F.

It will be noted that a shell 87 surrounds the tubes or passages 83 to present a neat appearance and to protect the tubes. If desired the tubes may be dispensed with and flanges carried by the shell 87 may be employed to provide the passages for the coolant, or coolant may merely be circulated through the chamber formed by the shell 87 and the casing of the motor.

The second embodiment

Figure 2:
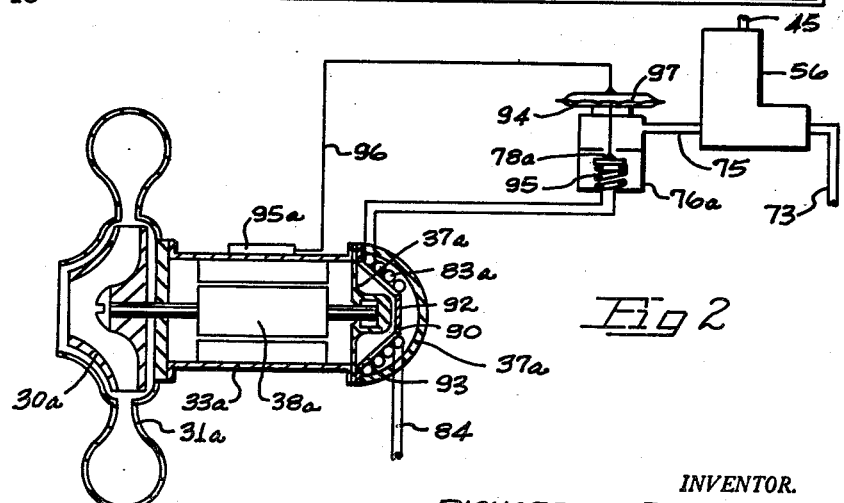
FIGURE 2 is a view illustrating a second embodiment of the invention.

Referring to the embodiment shown in FIGURE 2, it will be noted that the impeller 30a of a compressor 31a is driven from the rotor 38a of a motor 33a having a shaft-supporting plate or end bell 37a. In order to cool motor 33a there is provided a refrigerant jacket structure in the form of a section of coiled tubing 83a inside of the end bell 37a. Tubing 83a is supported on a spider-like bracket 90 which includes a central disk 92 and a plurality, for example four radiating arms 93. Liquid refrigerant is passed through coil 83a through a fixed orifice or aperture thermostatic expansion valve 76a which includes a flow restricting element 78a operated by a diaphragm 94 against the opposing force of a compression spring 95. The position of the diaphragm 94 may be controlled in a conventional manner by the temperature condition of a thermal bulb 95a positioned closely adjacent motor 33a as shown in FIGURE 2. Capillary tubing 96 connects bulb 95a with an operating chamber 97 formed above the diaphragm 94. The FIGURE 2 structure is of course utilized in conjunction with a compressor and condenser (not shown) in the same manner as that illustrated in FIGURE 1.

In the operation of the FIGURE 2 embodiment the passage of refrigerant through the coil 83a is effective to extract heat from the motor 33a so as to maintain the motor at a safe operating temperature. In the FIGURE 2 embodiment the cooling rate is thermostatically controlled by the bulb 95a.

Extended scope of invention

While variable orifice restrictors have been illustrated and described for feeding liquid refrigerant into the motor cooling coil, it is to be included within the scope of the invention to utilize fixed orifice device or metering mechanisms such as capillary tubes for this purpose.

Advantages of the invention

It will be appreciated that each of the illustrated embodiments defines a compressor motor cooling system in which no cooling fluid other than the compressor refrigerant is necessary.

Also, the present invention provides that motors can be reduced substantially in size. This means that the weight of the motors is reduced and that less material is required for manufacture, providing substantial reductions in cost and greatly improved economy of manufacture.

Further, it should be pointed out that the motor effluent returns to the low-pressure side of the refrigeration system, i.e., upstream of the compressor. Thus, highly effective flashing and cooling are provided.

A particular advantage provided by the present invention resides in the fact that the motor evaporator is sealed from the motor and thus the refrigerant does not become contaminated with oil and does not rob the bearings or the motor of lubricant.

It will also be noted that both embodiments utilize standard hermetic compressor motors, and require minimum alteration of the conventional refrigerant system in order to incorporate therein the compressor motor cooling components.

It will also be noted that the compressor motor cooling system is of such design that the automatic rate of cooling control provided by the FIGURE 2 expansion valve can be readily interchanged with the manual control provided by the member 82 in the FIGURE 1 embodiment so as to provide for the manufacture of both types of systems with minimum parts duplication.

As used herein the term "motor" is to be construed as an electric machine having a rotor and stator separated by an annular gap.

I claim:

1. A refrigerating system comprising a refrigerant evaporator; a refrigerant condenser; a refrigerant compressor; a motor for operating said compressor; a jacket structure surrounding at least a portion of the motor; means receiving liquid refrigerant from the condenser and feeding it into the jacket structure; means receiving evaporated refrigerant from the jacket structure and discharging it into the system upstream of the compressor; and a liquid refrigerant trapping means between the condenser and evaporator for insuring a supply of liquid refrigerant for the liquid feeding means, said liquid refrigerant trapping means comprising a float chamber having an inlet in its upper portion receiving liquid from the condenser, a first outlet in its lower portion discharging to the evaporator, a second outlet in its lower portion discharging to the liquid feeding means, and a float-valve assembly within said chamber operating to restrict flow through the first outlet when the liquid level in the chamber falls below a predetermined value.

2. A refrigerating system comprising a refrigerant evaporator; a refrigerant condenser; a refrigerant compressor; a motor for operating said compressor; a jacket structure surrounding at least a portion of the motor; means receiving liquid refrigerant from the condenser and feeding it into the jacket structure; means receiving evaporated refrigerant from the jacket structure and discharging it into the system upstream of the compressor; said liquid refrigerant feeding means comprising a variable orifice restrictor mechanism, thermostatic means responsive to motor temperature for operating said restrictor mechanism, and liquid refrigerant trapping means between the condenser and evaporator for insuring a supply of liquid refrigerant for the liquid feeding means, said liquid refrigerant trapping means comprising a float chamber having an inlet in its upper portion receiving liquid refrigerant from the condenser, a first outlet in its lower portion discharging to the evaporator, a second outlet in its lower portion discharging to the liquid feeding means, and a float valve within said chamber operating to restrict flow to the first outlet when the liquid level in the chamber falls below a predetermined value.

3. A refrigerating system comprising a refrigerant evaporator; a refrigerant condenser; a refrigerant compressor; a motor for operating said compressor; a jacket structure surrounding at least a portion of the motor; means receiving liquid refrigerant from the condenser and feeding it into the jacket structure; and means receiving evaporated refrigerant from the jacket structure and discharging it into the system upstream of the compressor; the liquid refrigerant feeding means comprising a variable orifice restrictor means, manually operable means for adjusting said restrictor means, and liquid refrigerant trapping means between the condenser and evaporator for insuring a supply of liquid refrigerant for the liquid feeding means, said liquid refrigerant trapping means comprising a float chamber having an inlet in its upper portion receiving liquid from the condenser, a first outlet in its lower portion discharging to the evaporator, a second outlet in its lower portion discharging to the liquid feeding means, and float means within said chamber to restrict flow through the first outlet when the liquid level in the chamber falls below a predetermined level.

4. The combination comprising a refrigerating system including a refrigerant compressor, refrigerant condenser, and refrigerant evaporator arranged in series flow relationship; an electric motor for operating said compressor; first auxiliary passage means receiving liquid refrigerant from the condenser and directing it into heat exchange relationship with the motor for extracting unwanted heat therefrom; second auxiliary passage means for returning vaporized refrigerant from said first passage means to the system; said first passage means comprising a variable orifice restrictor mechanism; and thermostatic means responsive to motor temperature for operating said restrictor mechanism to enlarge same on motor temperature increase and reduce same on motor temperature decrease, and liquid refrigerant trapping means between the condenser and said first auxiliary passage means, said liquid refrigerant trapping means comprising a chamber having an inlet in its upper portion receiving liquid from the condenser, a first outlet in its lower portion discharging to the evaporator, a second outlet in its lower portion discharging to the liquid feeding means, and means within said chamber operating to restrict flow through the first outlet when the liquid level in the chamber falls below a predetermined value.

5. The combination comprising a refrigerating system including a refrigerant compressor, refrigerant condenser, and refrigerant evaporator arranged in series flow relationship; an electric motor for operating said compressor; first auxiliary passage means receiving liquid refrigerant from the condenser and directing it into heat exchange relationship with the motor for extracting unwanted motor heat and thereby becoming vaporized; second auxiliary passage means for returning vaporized refrigerant from said first passage means to the system; said first passage means comprising a variable orifice restrictor mechanism and means for adjusting the flow size of the restrictor mechanism to thereby control the motor temperature; and a float controlled liquid refrigerant trap between the condenser and said first auxiliary passage means.

6. In a refrigerating system, a refrigerant evaporator, a refrigerant condenser, a refrigerant compressor, conduit means connecting said compressor, condenser and evaporator in operable relationship, a motor for operating said compressor, a jacket structure completely surrounding the stator of the motor, means receiving liquid refrigerant from the condenser and feeding it into the jacket structure, means receiving evaporated refrigerant from the jacket structure and discharging it into the system upstream of the compressor, and said liquid refrigerant feeding means comprising an orifice restrictor mechanism and a float controlled liquid refrigerant trap.

7. A refrigeration system, comprising a refrigerant evaporator, a refrigerant condenser, a refrigerant compressor, and conduit means connecting said evaporator, condenser and compressor in operable relationship, a motor for operating said compressor, a jacket structure surrounding the stator of said motor, means receiving liquid refrigerant from the condenser and feeding it into the jacket structure, and means receiving evaporated refrigerant from the jacket structure and discharging it into the system upstream of the compressor, restrictor means in the liquid refrigerant feeding means and positioned close to said jacket structure, said restrictor means determining the rate of flow of refrigerant to said structure and thereby the rate of heat withdrawal from said motor, and said feeding means including a float-controlled liquid refrigerant trap.

8. In a refrigeration system including a motor-drive compressor, a condenser and an evaporator coupled in operable relation, and having a high pressure compressor-condenser side and a low pressure evaporator side, the improvement wherein the motor has a rotor and stator separated by an annular gap, a jacket structure comprising a coil-like shape surrounding at least a portion of the stator and in intimate heat-exchange relation thereto, means including a conduit for introducing liquid refrigerant into said jacket from the high pressure compressor-condenser side, said conduit including an orifice restrictor mechanism, and means including a conduit for returning refrigerant from the jacket to the low pressure evaporator side to result in the major portion of the refrigerant flashing to vapor in effective contact with the stator to remove heat therefrom.

References Cited by the Examiner

UNITED STATES PATENTS

| 2,247,950 | 7/41 | Kucher | 62—505 |
| 2,746,269 | 5/56 | Moody | 62—505 |
| 2,891,391 | 6/59 | Kocher | 62—505 |

FOREIGN PATENTS 731,452  5/32  France.

ROBERT A. O'LEARY, *Primary Examiner.*

MEYER PERLIN, PERCY L. PATRICK, *Examiners.*